United States Patent
Braedt

(10) Patent No.: US 12,157,539 B2
(45) Date of Patent: Dec. 3, 2024

(54) DRIVE ARRANGEMENT OF A BICYCLE HAVING A MULTI-SPROCKET ARRANGEMENT

(71) Applicant: SRAM DEUTSCHLAND GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 600 days.

(21) Appl. No.: 17/353,309

(22) Filed: Jun. 21, 2021

(65) Prior Publication Data

US 2021/0309320 A1    Oct. 7, 2021

Related U.S. Application Data

(63) Continuation of application No. 15/388,638, filed on Dec. 22, 2016, now Pat. No. 11,066,125.

(30) Foreign Application Priority Data

Dec. 23, 2015  (DE) .......................... 102015016767.7

(51) Int. Cl.
*B62M 9/10* (2006.01)
*F16H 55/30* (2006.01)

(52) U.S. Cl.
CPC ............... *B62M 9/10* (2013.01); *F16H 55/30* (2013.01)

(58) Field of Classification Search
CPC .................................. B62M 9/10; F16H 55/30
See application file for complete search history.

(56) References Cited

U.S. PATENT DOCUMENTS

| 5,716,297 | A | 2/1998 | Bodmer |
| 6,045,472 | A | 4/2000 | Sung et al. |
| 2007/0049437 | A1 | 3/2007 | Wickliffe |
| 2009/0082147 | A1* | 3/2009 | Braedt ..................... B62M 9/10 474/160 |

(Continued)

FOREIGN PATENT DOCUMENTS

| DE | 69104865 | 3/1995 |
| DE | 102012023819 | 6/2013 |

(Continued)

*Primary Examiner* — Michael R Mansen
*Assistant Examiner* — Mark K Buse

(57) ABSTRACT

A drive arrangement for a bicycle has a multi-sprocket arrangement for a rear wheel hub of the bicycle. The multi-sprocket arrangement comprises a plurality of sprockets with different diameters, wherein the sprockets each have a plurality of teeth which are separated by tooth spaces, and which can be placed in engagement with a drive chain with wide and narrow chain links which follow one another alternatively in succession. On a circumference of at least a starting sprocket of the plurality of sprockets, at least one sequence of teeth is provided at a location where a changeover of the drive chain from the starting sprocket to a selected sprocket occurs. The sequence of teeth comprises a first tooth having a tooth base that is tangent to a root circle of the starting sprocket or lies radially outside of the root circle, and at least one additional tooth which follows the first tooth lies with its tooth base radially within the root circle of the starting sprocket.

18 Claims, 10 Drawing Sheets

(56) References Cited

U.S. PATENT DOCUMENTS

| | | |
|---|---|---|
| 2012/0208662 A1* | 8/2012 | Braedt .................. B62M 9/10 |
| | | 474/160 |
| 2013/0072334 A1 | 3/2013 | Braedt |
| 2013/0139642 A1* | 6/2013 | Reiter .................. B62M 9/105 |
| | | 74/594.2 |
| 2014/0338494 A1 | 11/2014 | Sugimoto et al. |
| 2014/0364259 A1 | 12/2014 | Reiter et al. |
| 2015/0198231 A1 | 7/2015 | Emura |
| 2015/0226305 A1 | 8/2015 | Pfeiffer |
| 2015/0226307 A1 | 8/2015 | Pfeiffer |
| 2015/0226308 A1 | 8/2015 | Pfeiffer |
| 2015/0285362 A1 | 10/2015 | Pfeiffer |
| 2017/0101159 A1 | 4/2017 | Watarai et al. |
| 2018/0290712 A1 | 10/2018 | Taniguchi et al. |

FOREIGN PATENT DOCUMENTS

| | | |
|---|---|---|
| DE | 102014019528 | 7/2015 |
| DE | 102015000715 | 8/2015 |
| DE | 102015006582 | 11/2015 |

* cited by examiner

1

DRIVE ARRANGEMENT OF A BICYCLE HAVING A MULTI-SPROCKET ARRANGEMENT

This application is a continuation of U.S. patent application Ser. No. 15/388,638, filed on Dec. 22, 2016, which claims priority to German Patent Application No. 10 2015 016 767.7, filed on Dec. 23, 2015, the contents of which are herein incorporated in their entirety.

FIELD OF DISCLOSURE

The present invention relates to a drive arrangement of a bicycle having a multi-sprocket arrangement for a rear wheel hub of the bicycle with improved gearshift characteristics, reduced vibrations during skewed running of the drive chain, and improved wear behavior, which drive arrangement is optimized in particular for operation with above-average drive loads.

BACKGROUND

Document DE 10 2012 023 819 A1 presents a front sprocket for attachment to a pedal crank of a bicycle, said sprocket being characterized by improved chain guidance in relation to conventional sprockets. The improved guidance characteristics make it possible, when using a single such sprocket on a pedal crank of a bicycle, to dispense with additional chain guides. This is the case even if no chain guide of a chain derailleur is provided. This characteristic is a crucial advantage in particular in the case of bicycles for off-road use and in the case of which, owing to unevenness in the terrain and in the event of intense steering movements, the chain has a tendency to jump off the sprocket. The improved guidance characteristics are achieved in particular in that the sprocket has, as viewed in the axial direction of the pedal crank, thick and thin teeth which are arranged in alternating fashion in the circumferential direction.

Furthermore, said teeth may be of particularly long form in a radial direction, wherein the tooth spaces may be formed so as to be only insignificantly larger in a circumferential direction than the chain rollers received therein. Furthermore, it is possible to provide free spaces in order to provide space for the inner links of the chain, which project relative to the chain rollers.

In the case of these documents, on a proper pedal crank, in each case only one of said sprockets is provided, such that a front derailleur can be dispensed with. The need for the roller-type drive chain to be changed over to an adjacent sprocket in the load strand, which normally poses high demands owing to the chain tension forces prevailing in the load strand, is thus eliminated. The stated sprockets are not suitable for use on a rear wheel hub, because the exceptionally good chain guidance characteristics oppose a change-over to an adjacent sprocket.

Similar sprocket arrangements which are provided and described for attachment to the pedal crank are also known from the subsequently published patent applications US 2014/0338494 A1, DE 10 2014 019 528 A1, DE 10 2015 006 582 A1 and DE 10 2015 000 715 A1. All of said documents present front sprockets with differently designed teeth, wherein said documents concern embodiments in particular for stable chain guidance.

Gearshift processes at multi-sprocket arrangements of a pedal crank, and associated requirements, however differ significantly from those of a multi-sprocket arrangement for a rear wheel hub of a bicycle. In the case of a driving sprocket (at the pedal crank), the chain roller is received in each case by the load flank of the sprocket. The drive direction defines that the gearshift process must be performed in the load strand. In the case of a driven sprocket, for example a sprocket of a multi-sprocket arrangement attached to a bicycle rear wheel, the chain roller runs in, in each case on or close to the run-in flank, in the idle strand of the drive. The chain guidance is performed by the gearshift mechanism toothed roller, such that the run-in situation onto the respective sprocket does not involve significant skewed running. This gives rise to completely different demands being placed on the gearshift and on the guidance of the chain for a rear sprocket on the rear wheel of a bicycle and for a front sprocket on the pedal crank.

The gearshift behaviour in multi-sprocket arrangements under the action of high drive loads in the drive arrangement is of considerable importance. High drive loads may arise, in the case of multi-sprocket arrangements for a rear wheel hub of a bicycle, for example in usage situations in high-performance sport in the case of trained professional or semi-professional riders. Owing to the increasing usage of mountain bikes with electric drive assistance, however, such above-average loads are also attained by riders with less training. In the case of such electrically assisted bicycles being used for sport, the operating loads achieved by high-performance sportsmen and women are even greatly exceeded.

The trend in the case of such multi-sprocket arrangements is toward a large transmission ratio spread with in some cases large transmission ratio steps between adjacent sprockets. This means that there are in some cases unconventionally large differences in numbers of teeth between two adjacent sprockets. In this context, where the expression "sprockets" is used, this relates, in the context of the description of the present invention, to sprockets which are used on rear wheel hubs, and which, in technical jargon, are also referred to as pinions.

With regard to the possibility of performing gearshifts under load from a relatively large sprocket to a relatively small sprocket, a so-called outboard gearshift process, there is the problem, in the case of large transmission ratio steps, of the increasingly deviating tangential condition of two adjacent gearshift positions. This means that, owing to the large transmission ratio step, the chain, in the region of its free strand, does not run tangentially from the relatively large sprocket onto the relatively small sprocket. In the case of conventional multi-sprocket arrangements, it is normally the case that two particular adjacent teeth are selected in order to realize provisions for a gearshift from the relatively large sprocket to the relatively small sprocket. By contrast to the gearshift from a relatively small sprocket to a relatively large sprocket, a so-called inboard gearshift process, it is not possible in the case of an outboard gearshift process to provide the same descent position for an inner link plate or an outer link plate of the drive chain. Rather, the descent of the chain from the relatively large sprocket to the relatively small sprocket takes place reliably only at a chain inner link plate.

FIGS. 11 and 12 serve for explaining the problem. FIG. 11 shows the situation for a relatively small transmission ratio step from a sprocket "a" of relatively large diameter, with forty (40) teeth, to a sprocket "b" of relatively small diameter, with thirty-eight (38) teeth. The two chain rollers "c" and "d" are still situated on the relatively large sprocket "a", whereas the two chain rollers "e" and "f" are already lying on the relatively small sprocket. When the chain runs off the relatively large sprocket, a free chain length is provided, and an interruption in force between the drive input and drive output occurs. The numerical value 0.59 millimeters corresponds to the deviation from the tangential condition. This means that the drive chain, by way of the chain roller "e", does not run ideally into the relatively small sprocket "b", but rather is spaced apart from the load flank by 0.59 millimeters, such that the chain roller "e" does not bear against the load flank "g" of the relatively small sprocket "b". Thus, it is initially the case, owing to said spacing, that there is no transmission of force.

Whereas such conditions are still tolerable in the case of relatively small transmission ratio steps, said effect of the deviation from the tangential condition is intensified in the case of relatively large transmission ratio steps, that is to say in the event of a changeover of the drive chain from the sprocket a to a considerably smaller sprocket "b'", as illustrated in FIG. 12. In this situation, in which the sprocket "a" in turn has forty (40) teeth and the sprocket "b'" has thirty-two (32) teeth, the path of the free chain length is considerably longer, and is, correspondingly to the transmission ratio, considerably more noticeable to the rider as "free fall" at the pedal. It can be seen that, in this situation, the chain roller "e'" strikes the sprocket "b'" with a considerable spacing. The numerical value is in this case 2.34 millimeters, that is to say the chain roller "e'" would be at a distance of 2.34 millimeters from the load flank. In such a situation, a transmission of force is initially not possible for a relatively long period of time. The chain initially runs substantially without resistance until abrupt contact occurs between the chain roller "e'" and load flank. In the case of motor-assisted bicycles, but also in the case of sprint situations in high-performance sport, said situation may lead to severe damage in the drivetrain owing to suddenly occurring load peaks, which may as a result give rise to bending of the sprocket, broken-off teeth, chain cracks, chain throw-off, gearing damage at the electric motor or the like.

It is an object of the present invention to provide a drive arrangement of a bicycle having a multi-sprocket arrangement for a rear wheel hub of the bicycle, which drive arrangement permits a precise changeover of the drive chain even under high operating loads and, during operation, exhibits improved wear behavior and a low tendency to vibrate.

SUMMARY

A multi-sprocket arrangement is provided for a rear wheel hub of the bicycle. The multi-sprocket arrangement comprises a plurality of sprockets with different diameters, wherein the sprockets each have a plurality of teeth which are separated by tooth spaces, and which can be placed in engagement with a drive chain with wide chain links and narrow chain links which follow one another alternatively in succession. On a circumference of at least a starting sprocket of the plurality of sprockets, at least one sequence of teeth is provided at a location where a changeover of the drive chain from the starting sprocket to a selected sprocket occurs. The sequence of teeth comprises a first tooth having a tooth base that is tangent to a root circle of the starting sprocket or lies radially outside of the root circle, and at least one additional tooth which follows the first tooth lies with its tooth base radially within the root circle of the starting sprocket.

BRIEF DESCRIPTION OF DRAWINGS

FIG. 6b shows a perspective partial rear view of the sprocket from FIG. 6a;

FIGS. 7a-e are various illustrations for explaining the effect of an axially offset riding-up tooth, wherein:

FIG. 7a shows a sectional view through a narrow chain link in the section plane I-I in FIG. 7c, FIG. 7b shows a sectional view through a narrow chain link in the section plane II-II in FIG. 7c, FIG. 7c shows a schematic side view for explaining the interaction of the narrow chain links and the teeth, FIG. 7d shows a plan view of the section as per FIG. 7c, and FIG. 7e shows a view corresponding to FIG. 7d, wherein the middle narrow chain link is depicted only schematically in terms of its chain link plate intermediate space;

FIGS. 10a to 10f show various views for explaining the arrangement and effect of a riding-up projection, wherein FIG. 10a illustrates a perspective view of a pairing of two sprockets, wherein the sprocket of relatively large diameter has riding-up projections, FIG. 10b shows a plan view of the sprocket pairing as per FIG. 10a, FIG. 10c shows a view corresponding to FIG. 10a with a centrally sectioned drive chain engaged thereon, FIG. 10d shows a plan view of the sprocket pairing together with cut-away chain corresponding to FIG. 10c, and FIGS. 10e and 10f show views corresponding to FIGS. 10c and 10d with a complete chain.

DETAILED DESCRIPTION OF THE DRAWINGS

In particular, the abovementioned object is achieved by way of a drive arrangement of a bicycle having a multi-sprocket arrangement for a rear wheel hub of the bicycle, wherein the multi-sprocket arrangement comprises a plurality of sprockets with different diameters, wherein the sprockets each have a plurality of teeth which are separated by tooth spaces and which can be placed in engagement with a drive chain with wide and narrow chain links which follow one another alternatively in succession, wherein, on at least one sprocket, a corrective feature is provided which is designed such that the drive chain, as it revolves around a selected sprocket or during a sprocket changeover from a starting sprocket to a selected sprocket, is oriented, with regard to its wide and narrow chain links, in a predetermined chain link plate orientation relative to the teeth of the selected sprocket.

Figure 11:
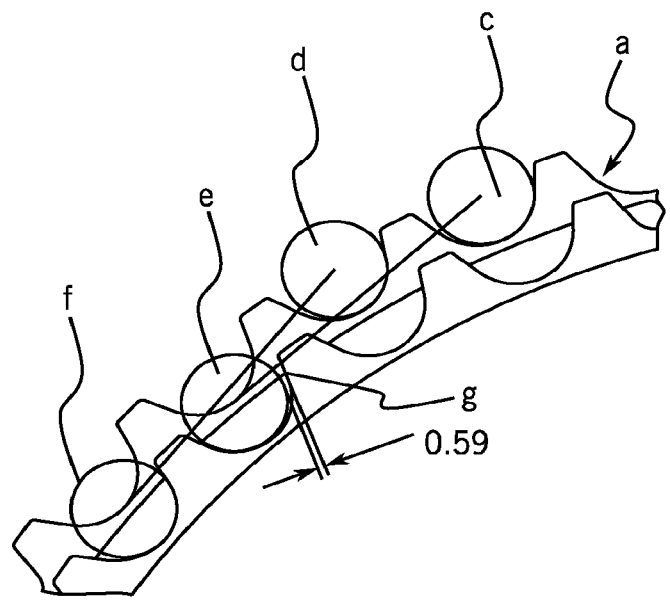
FIGS. 11 and 12 are illustrations which serve for the discussion, in the introduction, of the undesired deviation from the tangential condition.
Figure 12:
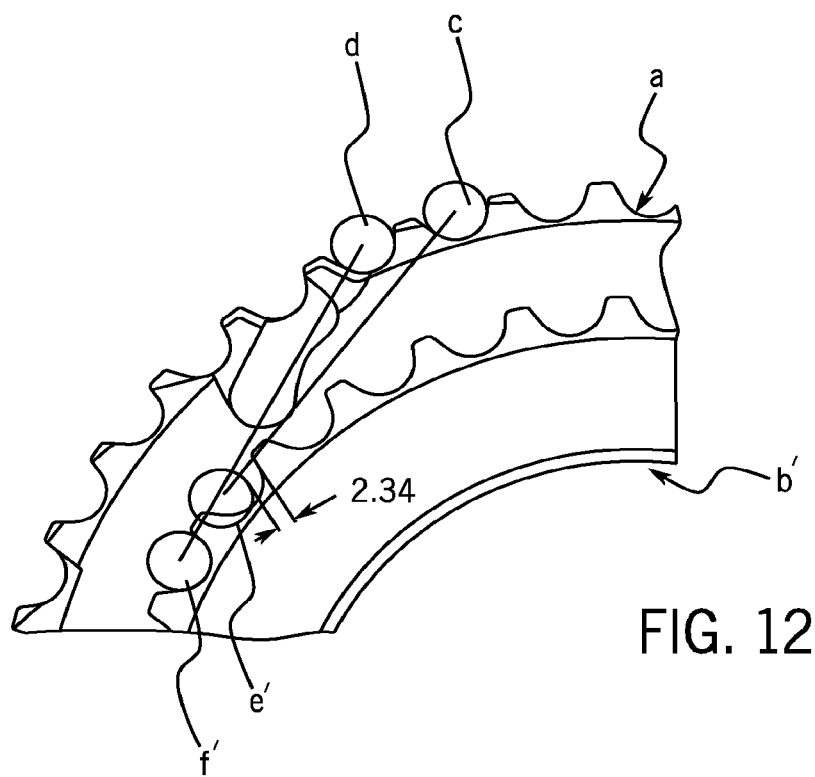

By way of the present invention, it is thus the case, by way of the implementation of the corrective feature, that a chain link plate orientation is realized such that the states presented in the introduction with reference to FIGS. 11 and 12 are avoided, and instead, a precise changeover of the chain is possible even in the case of large transmission ratio steps. Furthermore, with the present invention, it is sought to realize a predetermined chain link plate orientation even in the situation in which the chain revolves around a selected sprocket. This is necessary for example if, on the circumference of a sprocket, a tooth is provided which, owing to its position or design, can enter only into the intermediate space of a wide chain link, but does not fit completely into the intermediate space of a narrow chain link. For this purpose, in a refinement of the invention it may be provided that, on the circumference of a sprocket, as viewed in a circumferential direction, at least one sequence of teeth is provided, wherein at least one of the teeth of this sequence is designed for preferentially engaging into the intermediate space of the narrow chain links or for preferentially engaging into the intermediate space of the wide chain links, wherein the sequence of teeth is designed to correctively orient the chain such that the at least one tooth enters into the preferential engagement with the intermediate space of the narrow chain links or into the preferential engagement with the intermediate space of the wide chain links. In other words, in such a situation, it is achieved by way of the corrective feature that the drive chain is correctively displaced on the sprocket by the distance of one chain link in order to realize the desired chain link plate orientation relative to the respective sprocket.

An embodiment of the invention provides that, during a sprocket changeover from a starting sprocket to a selected sprocket, the sequence of teeth has a first tooth, the tooth base of which is tangent to the root circle of the respective sprocket or lies radially outside the root circle, wherein at least one additional tooth which follows the first tooth lies with its tooth base radially within the root circle of the sprocket. In other words, in this design variant of the invention, the chain is, by way of the sequence of teeth on the sprocket, guided further inward in a radial direction than would actually be predefined by the root circle of the respective sprocket. In this way, the path which is to be covered by the drive chain during the changeover from the relatively large sprocket to the next smaller sprocket, and in which a part of the chain runs freely without engaging with a sprocket, is shortened. In particular in the case of sprocket combinations with an asymmetrical gearshift channel arrangement, it is thus possible to ensure reliable load-transmitting engagement of the respective chain roller on the respective tooth of the relatively small sprocket.

In this embodiment of the invention, it may furthermore be provided that the sequence of teeth comprises a plurality of additional teeth whose tooth base lies radially within the root circle of the sprocket. In this way, it is possible even in the case of large transmission ratio steps to realize a changeover of the chain which is optimized with regard to the chain link plate orientation toward the relatively small sprocket.

In particular, in this context, it may be provided that the additional teeth, which lie with their tooth base radially within the root circle, of the sequence of teeth are, with increasing distance from the first tooth as viewed in the circumferential direction, arranged progressively further radially inward within the root circle of the respective sprocket. In other words, the profile of the chain can be displaced progressively radially further inward in stepped fashion.

In this context, an embodiment of the invention provides that the final additional tooth, which lies with its tooth base radially within the root circle, of the sequence of teeth is followed, as viewed in the circumferential direction, by a tooth which, with its tooth base, is tangent to the root circle of the sprocket or lies radially outside the root circle.

In this context, it may furthermore be provided that, adjacent to the final additional tooth, which lies with its tooth base radially within the root circle, of the sequence of teeth, a front recess for forming a gearshift channel is provided on the sprocket. This will be discussed in detail below.

In addition or alternatively to the embodiment with a partially reduced root circle diameter, it may also be provided that the selected sprocket comprises at least one riding-up tooth which, owing to its geometry and/or its arrangement on the sprocket, is designed such that, in the event of engagement into an intermediate space of a narrow chain link, the narrow chain link cannot, in its intermediate space, fully receive the riding-up tooth, such that the narrow chain link is seated on the riding-up tooth with a radially outward offset. This variant is selected in order to ensure that the drive chain, by way of its wide and narrow chain links which follow one another in alternating fashion, engages with the selected sprocket in a predetermined chain link plate orientation. If the selected sprocket, for example for the purposes of improved drive chain guidance during regular chain running or for gearshift purposes, has at least one tooth which is wider in terms of its axial extent than the width of a narrow chain link intermediate space, said tooth cannot extend fully into a narrow chain link intermediate space. Instead, the narrow chain link lies on the top of said wide tooth, which is in itself disadvantageous with regard to a transmission of force and can cause the chain to slip off. This effect, which is in itself undesirable, may however advantageously be utilized according to the invention to orient the chain in targeted fashion, with regard to its chain link plate orientation, by the distance of one chain link, such that the narrow chain link slips off said wide tooth and, as a result, the subsequent wide chain link engages with said wide tooth, the riding-up tooth. In this context, it is provided in an embodiment that the riding-up tooth is, in terms of its geometry and arrangement, designed such that a wide chain link can, in its intermediate space, fully receive the riding-up tooth.

Another embodiment provides that the riding-up tooth is, in terms of its geometry and arrangement, designed such that, in the event of engagement into a narrow chain link, subsequent chain joints counter to the direction of rotation are positioned radially further outside a pitch circle than in a situation in which the riding-up tooth engages fully into a wide chain link.

It may also be provided that the sequence of teeth comprises a plurality of riding-up teeth, wherein, between two riding-up teeth, there is provided in each case one tooth which, in terms of its geometry and arrangement, is designed such that a narrow chain link can, in its intermediate space, fully receive said tooth arranged between two riding-up teeth. By way of this measure, the chain can be displaced radially outward over a longer drive chain section on the respective sprocket, in order to thereby realize a desired chain link plate orientation.

In this context, it may also be provided that the sequence of teeth is designed such that the chain is displaced radially outward over a chain section long enough that a synchronizing, controlled jump-over of the chain by the distance of one chain link occurs. In order, during this process, to prevent the chain from sliding off the sprocket in an axial direction, the riding-up tooth and/or additional teeth may be designed with a roof-shaped tooth tip.

A design variant provides that the sequence of teeth has at least 3, preferably at least five (5) riding-up teeth.

It is possible for the riding-up tooth to be offset in an axial direction. In other words, the riding-up tooth need not imperatively be formed with a relatively large material thickness, it rather being possible for the riding-up tooth, by way of an offset position alone, to prevent a narrow chain link plate, by way of its chain link plate intermediate space, from fully receiving the axially offset riding-up tooth. As already indicated above, as an alternative to this, it is possible for the riding-up tooth to have a projection, or to be of thickened form, in an axial direction.

Furthermore, it may be provided that the at least one riding-up tooth is formed close to a front recess of the sprocket for forming a gearshift channel. Again, reference is made to the detailed explanations given below with regard to the provision of a gearshift channel.

In addition or alternatively to the embodiments discussed above, it may also be provided, according to one embodiment, that a sprocket which is adjacent to the selected sprocket, and which is of relatively large diameter, of the sprocket arrangement is, on its front surface, formed with at least one riding-up formation, wherein the riding-up formation is designed such that the drive chain is oriented only in a predetermined chain link plate orientation relative to the teeth of the selected sprocket. In other words, the riding-up of the drive chain, that is to say the displacement of the drive chain radially outward for the purposes of orienting said drive chain, with regard to its chain link plates, in the drive chain longitudinal direction, is achieved by virtue of the drive chain interacting with the adjacent sprocket of relatively large diameter.

This may be achieved for example in that the riding-up formation is formed in the manner of at least one riding-up projection which projects in an axial direction from the front surface of the sprocket of relatively large diameter, wherein the drive chain lies, by way of a link plate of a wide chain link, radially on the riding-up projection, and here, complete engagement with the adjacent selected sprocket is prevented if the drive chain is not situated in the predetermined chain link plate orientation relative to the teeth of the selected sprocket. It is also possible according to the invention for a plurality of riding-up projections to be provided in order to displace the drive chain radially outward over a relatively long chain section which extends over multiple chain links.

In an embodiment, it may be provided that the riding-up projection is arranged on the sprocket of relatively large diameter such that, when a chain link of the drive chain lies radially on the riding-up projection, subsequent chain joints counter to the direction of rotation of the sprocket are positioned radially further outside a pitch circle than in a situation in which the riding-up tooth engages into a wide chain link.

As already indicated several times above, on at least the selected sprocket, there may be provided gearshift channels for a changeover of the drive chain between the selected sprocket and a relatively small sprocket, wherein, on the selected sprocket, there is provided at least one first gearshift channel for a changeover of the drive chain from the selected sprocket to a sprocket of relatively small diameter, this being referred to in technical jargon as an outwardly directed or outboard gearshift process, and wherein, on the selected sprocket, there is provided at least one second gearshift channel for a changeover of the drive chain from a sprocket of relatively small diameter to the selected sprocket, this being referred to in technical jargon as an inwardly directed or inboard gearshift process.

Here, it is possible for the at least one first gearshift channel and the at least one second gearshift channel to be arranged so as to be spaced apart from one another as viewed in the circumferential direction of the selected sprocket.

An embodiment provides that, in a manner dependent on the size of the selected sprocket, multiple first gearshift channels and/or multiple second gearshift channels are provided as viewed in the circumferential direction of the selected sprocket. It is accordingly possible, for example in the case of a pairing of two sprockets with a difference in numbers of teeth of eight (8), for in each case four (4) gearshift channels to be provided for an inwardly directed gearshift process and in each case four (4) gearshift channels to be provided for an outwardly directed gearshift process. In the case of smaller differences in numbers of teeth, fewer gearshift options with optimized tangential condition exist.

For example, in the case of a sprocket pairing of a relatively large sprocket with eighteen (18) teeth and a relatively small sprocket with fifteen (15) teeth, a total of three (3) gearshift channels are provided, specifically one gearshift channel for the outwardly directed or outboard gearshift process and two (2) gearshift channels for the inwardly directed or inboard gearshift process. This gearshift logic is expedient in particular because, in this way, it can be ensured that, in both gearshift directions, a displacement of the drive chain can be reliably performed within one revolution. If the drive chain is running on the sprocket with eighteen (18) teeth, said drive chain is already correctly positioned with regard to its chain link plate orientation, and can be correctly displaced onto the small sprocket in this orientation. By contrast, if the drive chain is running on the sprocket with fifteen (15) teeth, the two selectively acting gearshift channels for the inboard gearshift process are used, which ensure a directed profile of the chain toward the relatively large sprocket, even though the relatively small sprocket is in the form of a transition sprocket and has an odd number of teeth and, owing to the odd number of teeth, no predetermined chain link plate orientation is possible per se on the sprocket.

An embodiment provides that each gearshift channel proceeds from a gearshift channel reference tooth, wherein the gearshift channel reference tooth is, in the case of a first gearshift channel, the first tooth of the selected sprocket which, during a departure from the selected sprocket, no longer engages into a chain link intermediate space of the drive chain. In this context, it may be provided according to the invention that that tooth (T-1) of the selected sprocket which follows the gearshift channel reference tooth and which still engages into a chain link intermediate space of the drive chain is, at its side averted from the relatively small sprocket, formed with a reduced tooth thickness, wherein the material removal, measured from the rear side of the original (thick) tooth, preferably extends to a depth of 1.2-1.7 millimeters.

Furthermore, in this context, it may be provided that those teeth of the selected sprocket which directly follow the gearshift channel reference tooth and which in each case still engage into a chain link intermediate space of the drive chain are, at their side averted from the sprocket of relatively small diameter, formed with a reduced tooth thickness.

An embodiment provides that the gearshift channel reference tooth is, at its tooth tip, formed with a bevel facing toward the sprocket of relatively small diameter.

Furthermore, it may be provided that radially within the gearshift channel reference tooth, at that side of the selected sprocket which faces toward the sprocket of relatively small diameter, there is provided an outer link plate cutout which extends into the respective sprocket to a greater depth than a recess, adjoining the cutout, on the gearshift channel reference tooth.

Furthermore, an embodiment provides that the outer link plate cutout which is provided radially within the gearshift channel reference tooth extends into the selected sprocket to a greater depth than a recess adjoining the cutout, to a tooth, immediately preceding the gearshift channel reference tooth, of the selected sprocket.

In addition, it may be provided that the gearshift channel reference tooth has, in the region of its load flank, a deflecting bevel which extends preferably over the load flank radius as far as the root circle. In a particular refinement, said bevel may even extend as far as the run-in flank radius of the following tooth.

Furthermore, in this context, it is possible for the load-flank-side deflecting bevel of the gearshift channel reference tooth to transition into the outer link plate cutout.

Furthermore, it may be provided that individual teeth of the sprocket which are provided for engaging into the intermediate space of a wide chain link are equipped, on their force-transmitting load flank, with a chain link plate recess, wherein the at least one riding-up tooth is, on its load-free run-in flank, formed so as not to have a chain link plate recess.

In addition or alternatively to this, it may be provided that individual teeth of the sprocket which are provided for preferentially engaging into the intermediate spaces of the wide chain links are equipped, at least at one side, with an axial projection in accordance with the width of the intermediate spaces of the wide chain links.

An embodiment provides that individual teeth of the sprocket which are provided for preferentially engaging into the intermediate space of the wide chain links are, as viewed in a section orthogonal to a radial line, of cross-shaped or T-shaped or L-shaped form.

Simple manufacture of the multi-sprocket arrangement, which additionally makes it possible to realize a compact arrangement of the sprockets, provides that, in each case, the surfaces of at least a subset of the teeth, preferably of all of the teeth, of at least one of the sprockets on a side pointing toward an adjacent sprocket of relatively small diameter lie substantially in a common plane, wherein the individual teeth which have a front recess are exceptions to this.

Furthermore, it may be provided that at least one sprocket of relatively small diameter is oriented, in terms of phase, relative to an adjacent sprocket of relatively large diameter such that, during a changeover of the chain from the sprocket of relatively large diameter to the sprocket of relatively small diameter, synchronicity between the teeth of the sprocket of relatively small diameter and respectively associated chain links of the chain is realized.

Correspondingly, it may also be provided that at least one sprocket of relatively small diameter is oriented, in terms of phase, relative to an adjacent sprocket of relatively large diameter such that, during a changeover of the chain from the sprocket of relatively small diameter to the sprocket of relatively large diameter, synchronicity between the teeth of the sprocket of relatively large diameter and respectively associated chain links of the chain is realized.

As already indicated above, it is possible in the case of the multi-sprocket arrangement for at least one transition sprocket to be provided which has an odd number of teeth.

The advantages of the multi-sprocket arrangement include, but are not limited to, the following:

Performing gearshifts under load to sprockets of relatively small diameter is improved. This yields less variation in gearshift processes, and a reduced risk of undesired gearshift states.

Vibrations of the chain in the event of skewed running are reduced.

A so-called "autoshift", that is to say an inadvertent changeover of the chain to an adjacent sprocket, can be substantially prevented. The risk of the chain jumping off the sprocket is also reduced.

Wear is reduced even in high-load states, because, even with the provision of indentations on the teeth, owing to the thick teeth that are provided, adequately large contact surfaces still exist between chain rollers and tooth flanks. Furthermore, it is ensured that precise gearshifts can be realized, with sudden load peaks being avoided, even in high-load states.

Normally, the drive chain can depart from the sprocket at a particular gearshift channel only by way of the inner link plate. As a result, it is not possible for a gearshift to be performed at the same gearshift channel if an outer link plate passes the gearshift tooth. The solution to the problem consists in realizing, at sprockets with an even number of teeth, a defined chain link plate orientation. This is realized for example by way of the above-described various refinements of riding-up teeth or riding-up projections.

In particular during an inner plate link descent of the chain, it is possible by way of the invention to ensure a smooth gearshift even in the case of large steps, that is to say in the case of large differences in the numbers of teeth of adjacent sprockets.

The partially reduced root circle diameter at a sprocket constitutes, by contrast, a refinement which makes it possible to also realize asymmetrical gearshift channel arrangements.

In the case of conventional sprockets, it is scarcely possible to prevent uncontrolled outboard gearshift processes. In this context, problems arise in particular owing to a short free chain length to the gearshift mechanism roller and/or owing to the undesired effect of gearshift aids that are required for other functions, such as for example undesired effects of gearshift channels which are provided for inboard gearshift processes. The particular guide characteristics of the riding-up teeth, which are of materially thick form, can be used here to prevent an uncontrolled descent (outboard gearshift processes) of the chain.

In the case of inboard gearshift processes, the gearshift mechanism is actively actuated by way of a cable pull. During the ascent of the chain from a relatively small sprocket to a relatively large sprocket, the shortening of the chain effects a movement of the gearshift mechanism cage counter to the cage spring. This results in relatively high forces, which assist the ascent and run-in of the chain. By contrast, in the case of the outboard gearshift process, for the activation of the gearshift mechanism, the cable pull is released. A commonly used parallelogram spring of the gearshift mechanism must itself perform the actuating process, wherein said parallelogram spring must also overcome the friction forces in the cable pull system. In the case of the descent of the chain from a relatively large sprocket to a relatively small sprocket, chain length is released, which must be compensated again by way of the movement of the gearshift mechanism cage. In this case too, friction forces must be overcome, and the relatively low chain tensile forces are often not sufficient to ensure a clean run-in of the chain onto the relatively small sprocket. This problem is solved by way of the embodiment of the outboard gearshift channel.

Figure 1:
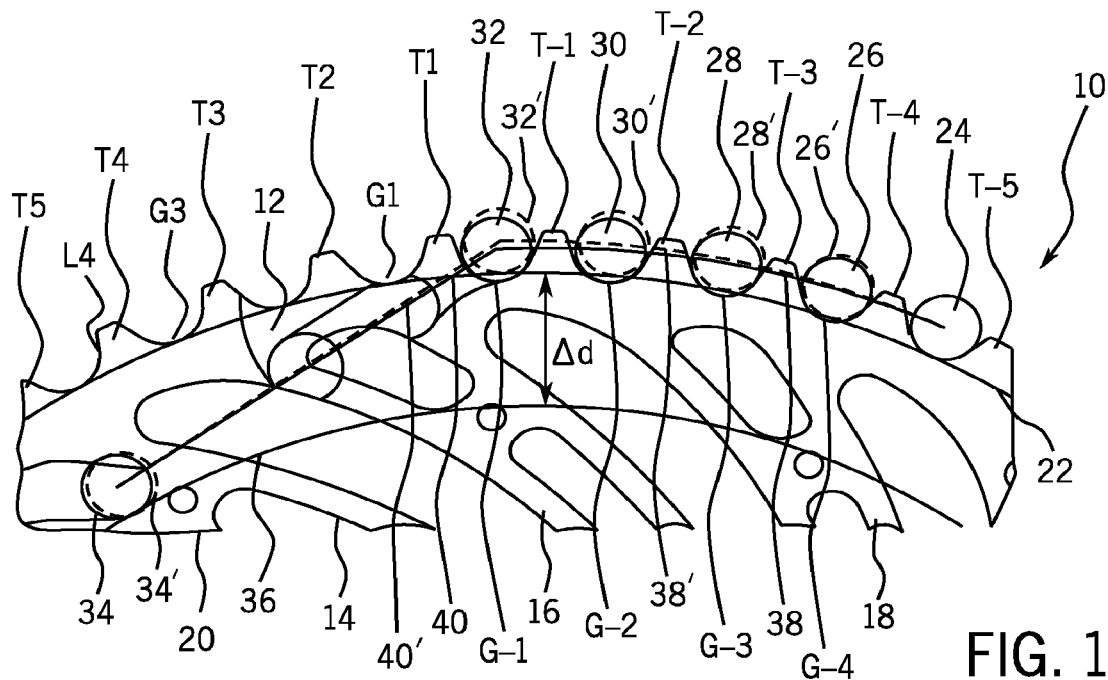
FIG. 1 shows a plan view of a detail of a sprocket with partially reduced root circle.

FIG. 1 shows a detail of a first embodiment of a sprocket 10 for a sprocket arrangement. Said sprocket has, on its outer circumference, a closed ring 12 with a row of teeth T1 to T5 and T-1 to T-5, wherein the tooth T1 is referred to as a reference tooth. It can be seen that the closed ring 12 is connected, by way of a row of arms 14, 16, 18 which run radially inward in curved fashion, to a hub which is not shown. The side facing the viewer is referred to as front side 20. The teeth are separated from one another by tooth spaces, wherein the tooth flanks that point to the left in the detail as per FIG. 1 are in each case the load flanks of the teeth T1 to T5 and T-1 to T-5, which, in a drive situation, interact in load-transmitting fashion with a drive chain. Correspondingly to the numbering of the teeth, there are, for each tooth, the load flanks L1 to L5 and L-1 to L-5, wherein only the load flank L4 is indicated by way of example.

The tooth spaces are described by an arcuate contour which transitions into the load flank Ln (L5 to L-5). Said arcuate contour, by way of its region situated furthest to the inside, which is also referred to as tooth base Gn (G5 to G-5) and of which only the tooth base G3 is indicated, is tangent in each case to a root circle 22.

It can also be seen in FIG. 1 that a drive chain lies on the sprocket 10. To simplify the illustrations, only the chain rollers 24, 26, 28, 30, 32 which bear in force-transmitting fashion against the load flanks L-1 to L-5 of the teeth T-1 to T-5 are shown. It can be seen that the chain roller 34 is situated radially considerably within the root circle 22 of the sprocket 10. In fact, the chain roller 34 lies on a root circle 36 which schematically represents a sprocket of relatively small diameter which has precisely that root circle 36.

The solid line 38, 40 describes the actual profile of the chain, which initially, along the section 38, runs along the circumference of the sprocket 10 in accordance with the engagement on the teeth T-1 to T-5, and which then, along the section 40, runs from the sprocket 10 to the sprocket of relatively small diameter represented by the root circle 36, wherein the chain roller 34 enters into engagement with a tooth of said sprocket. FIG. 1 thus shows a situation in which the chain is displaced from the sprocket 10 of relatively large diameter to the sprocket of relatively small diameter represented by the root circle 36. Here, it is essential that there is a relatively large diameter step "Δd", between the relatively large sprocket 10 and the sprocket of relatively small diameter, such that the freely running chain section 40 between the chain roller 32 and the chain roller 34 is relatively long.

As described in the introduction with reference to FIGS. 11 and 12, problems related to a deviation from the tangential condition may arise in such situations. Said problems would arise if the tooth spaces with the respective tooth base Gn, on which the chain rollers 24 to 32 in accordance with conventional sprockets were to lie on the root circle 22. This is shown in FIG. 1 by way of chain rollers and a chain profile line illustrated by dash-dotted lines. It can be seen that the chain rollers 26' to 32' illustrated by dash-dotted lines are all situated radially further to the outside than the chain rollers 26 to 32 illustrated by solid lines. Accordingly, the profile lines 38' and 40' are also shown as deviating from the solid lines. As a result, the chain roller 34' engages on the sprocket of relatively small diameter, represented by the root circle 36, in an unfavourable position.

To counteract these problems, the embodiment as per FIG. 1 provides that the tooth base points G-4, G-3, G-2 and G-1 are displaced radially inward in stepped fashion with increasing distance from the root circle 22, in order to thereby realize the chain line profile 38. The root circle 22 is thus partially reduced in terms of its diameter at the teeth T-4 to T-1. Accordingly, the transition section 40 can run onto the sprocket of relatively small diameter, represented by the root circle 36, at a shallower angle for the benefit of a reduction of the deviation from the tangential condition. This stabilizes the behaviour of the chain during a change-over from the sprocket 10 of relatively large diameter to the sprocket of relatively small diameter, represented by the root circle 36.

It can be seen that the following tooth base G-1 then lies on the root circle again.

Figure 2:
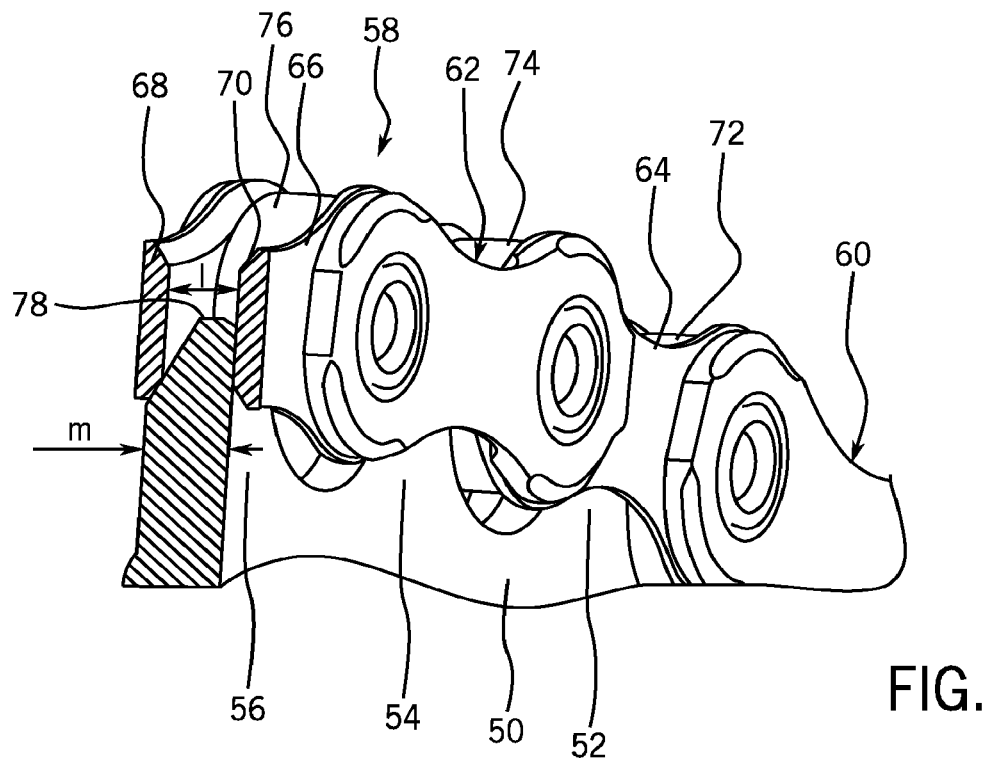
FIG. 2 shows a perspective sectional view of a sprocket with a riding-up tooth.

FIG. 2 shows an alternative embodiment of the invention in a perspective partially sectional view of a sprocket 50, of which only three (3) teeth 52, 54, 56 are visible, wherein the front tooth 56 is shown in a cross section. On the sprocket 50 there lies a drive chain 58 which is composed of a continuous row of wide chain links 60, 62 and interposed narrow chain links 64, 66, and correspondingly alternating wide and narrow chain links. The chain links are formed in each case by way of two chain link plates which are situated opposite one another and of which only the two chain link plates 68 and 70 illustrated in section are labelled. Furthermore, the chain links are connected to one another in the conventional manner by way of chain rollers 72, 74, 76 and associated riveted connections.

It can be seen that the tooth 56 is, at its tooth tip 78, formed with a roof-shaped contour with lateral bevels, which make it possible to engage more easily into a chain link intermediate space. It is however essential that the tooth 56 is formed as a riding-up tooth, wherein the material thickness "m" of said tooth is considerably wider than the clear width "l" between two adjacent link plates 66, 68 of a narrow chain link. The dimension difference "l"-"m" is of such a magnitude that the chain link plate 68 lies on the left-hand oblique contour surface of the roof profile of the tooth tip 78 in FIG. 2, such that the tooth 56 cannot fully engage between the two chain link plates 68 and 70 of the narrow chain link. The material thickness m of the tooth 56 is however selected such that the tooth 56 can engage fully into a chain link intermediate space of a wide chain link 60 or 62.

In other words, a riding-up tooth 56 which is formed with a relatively large material thickness "m" in this way has the effect that only wide chain links can receive said riding-up tooth 56 in their intermediate space, whereas narrow chain links ride up on the roof profile of the tooth tip 78 and are then situated radially further to the outside than in a situation in which a wide chain link engages with the riding-up tooth 56. If a situation as shown in FIG. 2 arises, this has the result that the drive chain 58 is situated radially further to the outside than in a normal chain engagement state. This can give rise to a situation in which the drive chain 58 does not sufficiently engage with the teeth and, under load, "slips onward" by one chain link relative to the sprocket 50 in the circumferential direction. This would mean that, then, a wide chain link, for example the following chain link 62, enters into engagement with the riding-up tooth 56 and, owing to its relatively large link plate spacing, fully receives the riding-up tooth 56, such that the adjacent chain rollers come into contact with the adjacent tooth base and enter into closely abutting and force-transmitting engagement with the tooth flanks.

This embodiment thus provides for at least one riding-up tooth 56 to be provided which, on its own or in a sequence of multiple riding-up teeth, effects a displacement of the drive chain 58 radially outward if the chain link plate orientation of said drive chain is not suited to the respective sprocket. Owing to said displacement of the drive chain 58 radially outward, said drive chain, under load, slips onward by the distance of one chain link in the chain longitudinal direction, such that corresponding engagement is ensured. In this way, the drive chain 58 can, in a desired manner, be oriented in a suitable manner relative to the sprocket 50. This has the advantage that, during a gearshift process in which the chain is changed over for example from a relatively small sprocket to the sprocket 50, the chain itself can then be adjusted into a suitable chain link plate orientation relative to the sprocket 50 if the chain, proceeding from the relatively small sprocket, does not run into the sprocket 50 in suitable fashion. Such a state arises for example if the relatively small sprocket is a transition sprocket which has an odd number of teeth. Without special provisions, depending on the number of revolutions of the relatively small sprocket during a gearshift process, either a wide or a narrow sprocket will be the first to enter into engagement with the sprocket 50 of relatively large diameter at the same angular position of the relatively small sprocket. Thus, a suitable chain link plate orientation relative to the sprocket 50, or specifically an unsuitable chain link plate orientation relative to the sprocket 50, may arise, wherein in the latter case, a correction of the chain link plate orientation relative to the sprocket 50 is necessary.

This measure is expedient in particular if the sprocket 50 is designed so as to require a correspondingly suitable chain link plate orientation, such as, for example, in the case of a sprocket 50 which, at least in sections, has a sequence of thick and thin teeth for the purposes of improving the chain guidance.

Figure 3:
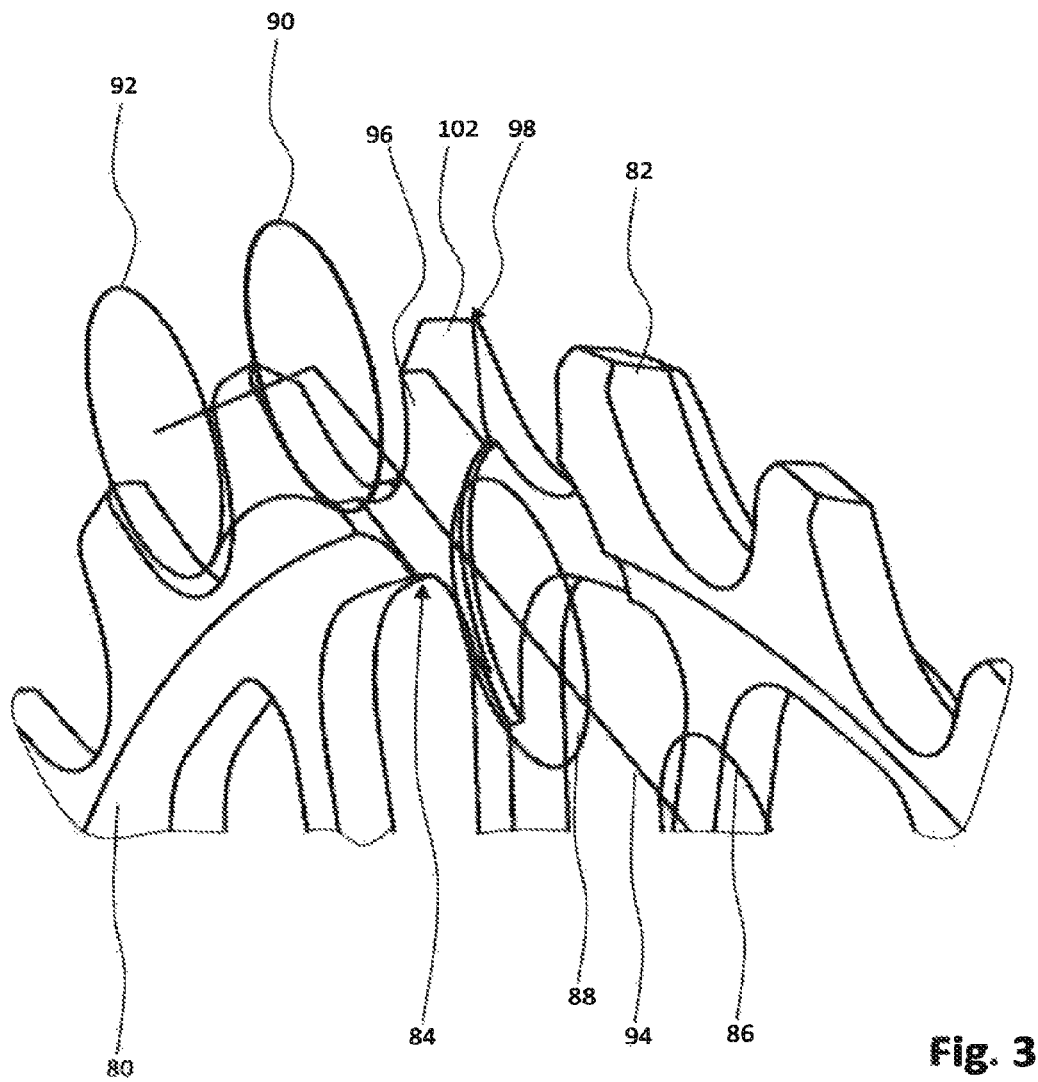
FIG. 3 shows a perspective detail view of a sprocket for the explanation of an inboard gearshift channel.

FIG. 3 shows a corresponding embodiment of a sprocket 80 with a riding-up tooth 82 of materially thick form. Said sprocket 80 is additionally equipped with a so-called gearshift channel 84 which, correspondingly to the arrow P, provides that a chain, denoted in stylized fashion only by way of indicated chain rollers 86, 88, 90, 92, is lifted from a sprocket of relatively small diameter (not shown) onto the sprocket 80 during the course of a gearshift process. This is also illustrated by way of the chain line profile 94. It can be seen that the gearshift channel 84 has a chain link plate recess 96 which is formed directly underneath the riding-up tooth 82. The riding-up tooth 82 is followed by a reference tooth 98 with a front-side recess 100 and with a tooth tip with a deflecting bevel 102. The arrangement of said riding-up tooth firstly has the effect that, in the case of an unsuitable chain link plate orientation, the drive chain is, as a result of revolution around the sprocket 80, displaced in its longitudinal direction by the distance of one chain link and thus correctly oriented as described above, such that the riding-up tooth 82 is subsequently received in a wide chain link.

Furthermore, the arrangement of said riding-up tooth 82 directly at the gearshift channel 84 has the advantage that an undesired gearshift process from the sprocket 80 of relatively large diameter to the sprocket of relatively small diameter (not shown) is effectively prevented. The risk of such an undesired gearshift process exists in particular because the reference tooth 98 is so narrow and is formed with an additional deflecting bevel 102. In load situations or in the event of vibrations, there is the risk of a narrow chain link of the drive chain engaging into the side of said tooth, with an undesired gearshift process to the relatively small sprocket thus being initiated. Owing to the wide configuration of the riding-up tooth 82, the chain however scarcely has any lateral play, and is thus reliably led into engagement on the very narrow reference tooth 102. Said chain engages securely on the reference tooth 102 despite the narrow design of said reference tooth.

Figure 4:
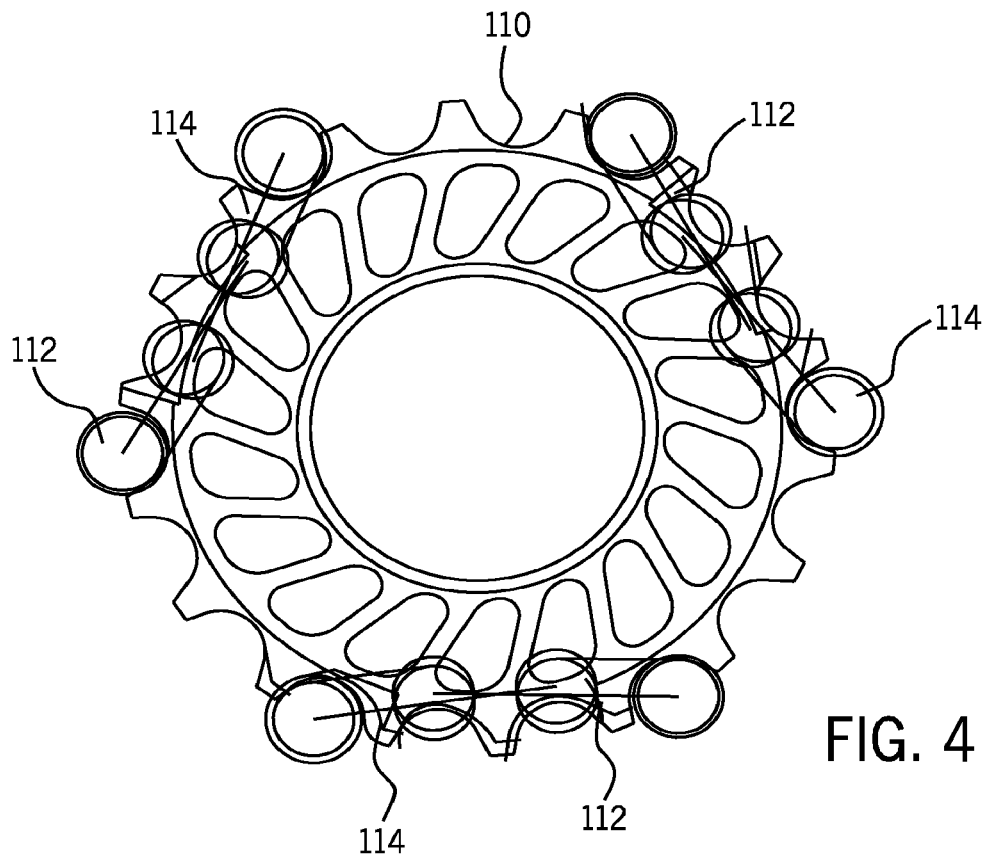
FIG. 4 is an illustration of the in each case three (3) inboard and outboard gearshift channel options for a sprocket with eighteen (18) teeth which is used in conjunction with a sprocket (not shown) with fifteen (15) teeth.
Figure 5:
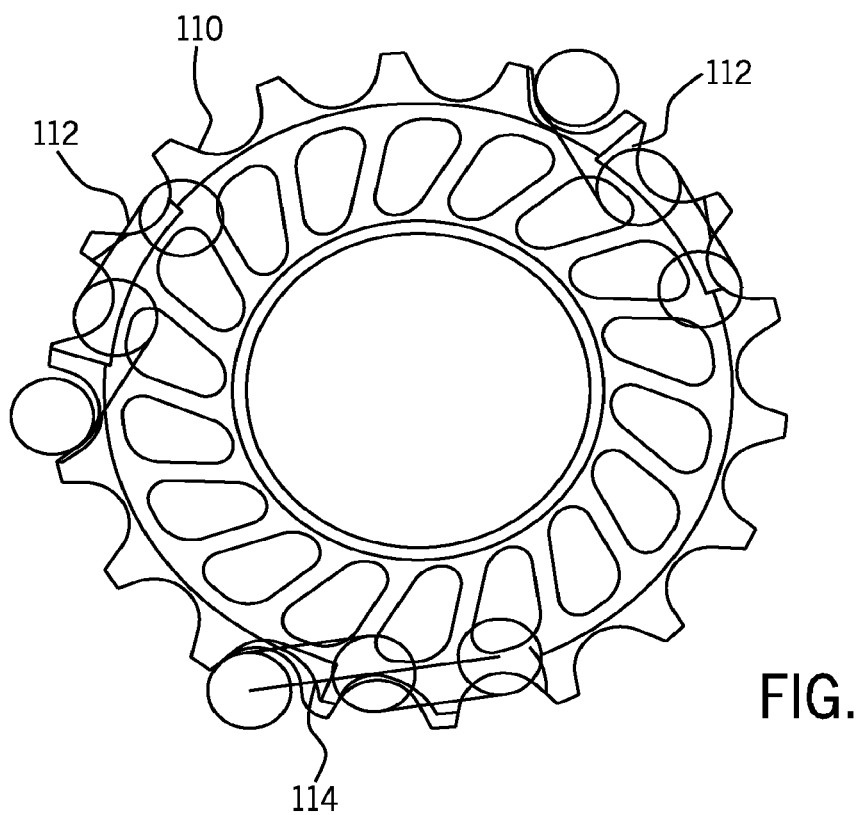
FIG. 5 is an illustration of the embodiment of the gearshift channel arrangement in the case of a sprocket combination with fifteen (15) and eighteen (18) teeth with one outboard and two (2) selective inboard gearshift channels.

FIGS. 4 and 5 illustrate the arrangement of gearshift channels. FIG. 4 shows the possibility of theoretically providing, in the case of a sprocket 110 with eighteen (18) teeth which is combined with a sprocket (not shown) with fifteen (15) teeth, a total of six (6) gearshift channels, specifically three (3) gearshift channels 112 for a gearshift process from the sprocket of relatively small diameter to the sprocket of relatively large diameter, which is referred to in technical jargon as an inboard gearshift process, and three (3) gearshift channels 114 for a gearshift process from the sprocket of relatively large diameter to the sprocket of relatively small diameter, which is referred to in technical jargon as an outboard gearshift process. The respective gearshift channels 112 and 114 are arranged relatively close to one another in pairwise fashion, and the inboard-outboard gearshift channel pairs are provided so as to be offset in each case by 120° relative to one another around the circumference of the sprocket 110.

In the case of this technology, the configuration of the underlying shift logic constitutes a particular challenge. Firstly, with regard to the tangential condition, it is often necessary to find a compromise between the inboard and outboard gearshift positions, wherein asymmetrical conditions can further exacerbate the situation. The method, described above with reference to FIG. 1, of the partially reduced root circle diameter in the case of outboard gearshift processes, that is to say in the case of gearshift processes from a sprocket of relatively large diameter to a sprocket of relatively small diameter, and the guidance of the chain along an arcuate profile in the case of inboard gearshift processes, such as is in part already known from the prior art, may be used individually and in combined fashion to solve said problem.

To ensure an optimum gearshift function, an embodiment uses inboard and outboard gearshift channels which are spaced apart from one another. In general, in this case, half of the available positions are used for the respective gearshift direction. In the case of a difference in numbers of teeth of eight (8) teeth, there are for example theoretically eight (8) gearshift options both for the inboard gearshift process and for the outboard gearshift process. However, in order to arrange these with an adequate spacing to one another, it is the case in this example that preferably four (4) inboard gearshift channels and (4) outboard gearshift channels are used.

In the case of relatively small differences in numbers of teeth (and small gearshift options) and/or in the case of a gearshift from a transition sprocket, further arrangements are possible. As an example, the gearshift step from a sprocket with fifteen (15) teeth (not shown) to a directional sprocket with eighteen (18) teeth will be discussed with reference to FIG. 5. Here, "directional" means that the drive chain is intended to interact with the sprocket with eighteen (18) teeth in a predetermined chain link plate orientation, for example because the said sprocket has a sequence of alternately arranged thick and thin teeth. From the difference in numbers of teeth, there are three (3) gearshift options with optimum tangential condition. A fully symmetrical sprocket combination is involved (e.g. fifteen (15) teeth and eighteen (18) teeth, wherein both numbers of teeth can be divided by three (3)). In order for the gearshift channels to be adequately spaced apart from one another, it is the case in FIG. 5 that only one (1) outboard gearshift channel 114 is used on the sprocket 110. Since a descent from a directional sprocket is involved, it is ensured that a gearshift process of said type is at any rate performed within one revolution. In the case of the ascent onto the sprocket 110 from the sprocket with fifteen (15) teeth, only selective gearshift channels can be used, because a directional run-in is demanded. For this reason, two (2) gearshift channels 112 are used for the ascent, because noticeable gearshift delays can otherwise occur.

Again, a detail of the chain is illustrated merely by way of a linear chain line profile and indicated chain rollers.

Figure 6A:
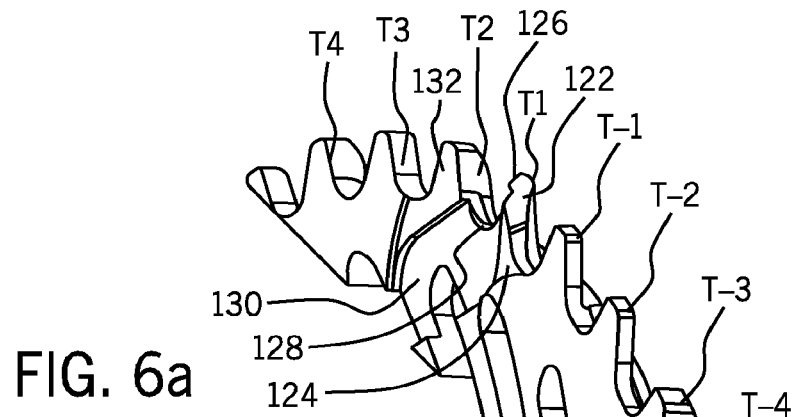
FIG. 6a shows a perspective partial front view of a sprocket with an outboard gearshift channel.
Figure 6B:
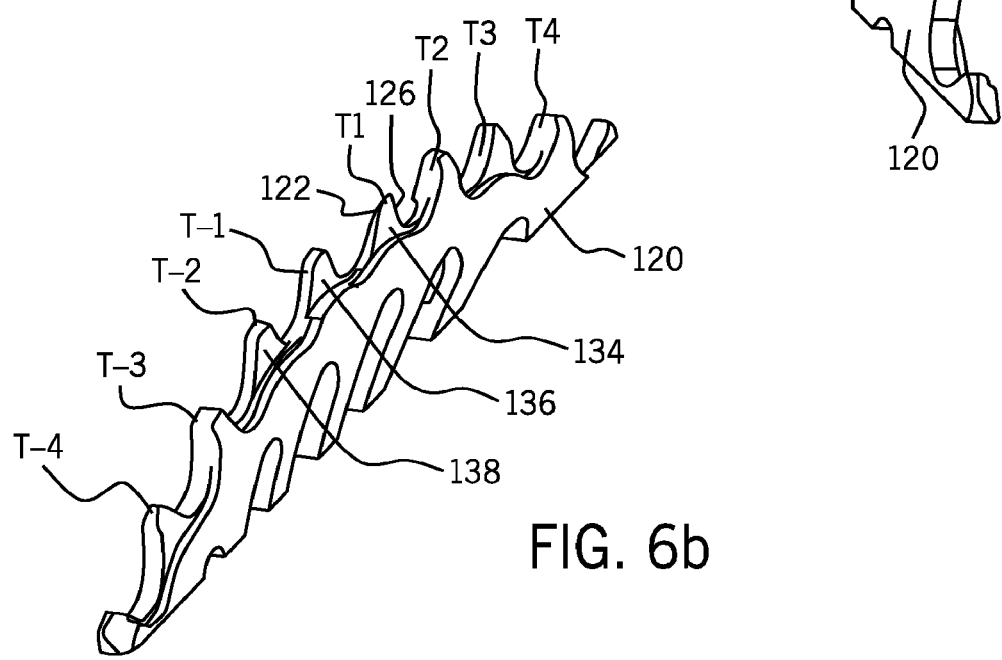
Figure 6C:
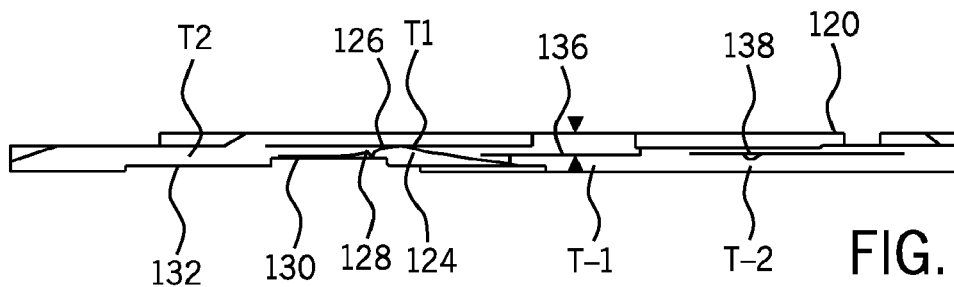
FIG. 6c shows a plan view of the section of the sprocket as per FIGS. 6a and 6b.

FIGS. 6a-6c show a further embodiment, wherein in particular, the configuration of a gearshift channel for an outboard gearshift process will be discussed. The illustrations show a detail of a sprocket 120 in a perspective view (FIGS. 6a, 6b) and in a plan view (FIG. 6c). Here, in particular, the design of the reference tooth T1 and of the surrounding teeth T-3, T-2, T-1, T2 and T3 will be discussed.

The reference tooth T1 has, on its tooth tip, a catching bevel 122. On the front side, there is provided a front-side inner link plate recess 124, whereby the material thickness of the reference tooth T1 is reduced. In the region of its load flank 126, the reference tooth T1 has an outer link plate deflecting bevel 128, that is to say a bevelled profile of the load flank. Said outer link plate deflecting bevel extends along from the load flank 126, across the tooth base to the next tooth T2. Below said region, the sprocket 120 has a further set-back outer link plate cutout 130. In this context, it is important for the outer link plate cutout 130 to be formed into the front side of the sprocket 120 to a greater depth than the inner link plate recess 124. In this way, it is reliably possible for an outer link plate of a drive chain to be received in said cutout 130 during an outboard gearshift process from the sprocket 120 of relatively large diameter to a sprocket of relatively small diameter. It can also be seen that a front-side recess 132 is provided on the tooth T2. Said front-side recess is arranged approximately in the same plane as the inner link plate recess 124. In other words, the cutout 130 is formed into the sprocket 120 to a greater depth than the two (2) recesses 124 and 132.

Viewing the opposite side of the sprocket 120 as per FIG. 6b, it is possible to see the rear-side recess 134 on the T1 and a rear-side recess 136, which is set back even further in relation thereto, on the tooth T-1. The extent of said set-back amounts to 1.2 millimeters to 1.7 millimeters in relation to a recess-free tooth. The tooth T-2 has a less pronounced rear-side recess 138.

The rear-side recess 136 on the tooth T-1 serves for providing the chain with enough space that it can be deflected toward the relatively small sprocket during the gearshift process. The deflection must be possible to such an extent that the catching bevel 122 on the tooth T1 prevents an engagement of the inner link plate, or the inner link plate passes the tooth T1 in the direction of the relatively small sprocket and thus initiates the descent process onto the relatively small sprocket. In the case of conventional sprockets, it is normally the case, at the tooth T-1, that the existing play of the chain is sufficient in the case of an outer link plate engagement. Here, however, the special guide characteristics of the sprocket according to the invention owing to the thick teeth that can engage into wide chain links necessitate the use of the rear-side recess 136, which has a particularly great depth, for example up to 1.7 millimeters as measured from the rear side of the sprocket, as already indicated above, by contrast to approximately 0.6 millimeters in the case of conventional sprockets from the prior art, if provided at all on said tooth according to prior art.

The load-flank-side outer link plate diverting bevel 128 provides space for the outer link plate during the descent process and assists the outer link plate in sliding off the load flank radius of the tooth T1 and off the associated root circle. This function is important in particular in the case of the implementation, according to the invention, of an outboard gearshift channel with reduced root circle diameter, as described with reference to FIG. 1. This function may however also be used in the case of gearshift channels without a root circle reduction. This feature may be implemented both as a bevel 128 and as a recess (not shown).

FIGS. 7a-7e show a further embodiment, in which it is likewise the case that a sprocket with at least one (1) riding-up tooth 144 is provided. Said riding-up tooth 144 is illustrated in FIGS. 7a-7e within a sequence of teeth 140, 142, 144, 146, 148, wherein the teeth 140, 144, 148 are in engagement with narrow chain links 150, 152, 154. The riding-up tooth 144 is distinguished by the fact that it is not formed with a relatively great material thickness but is laterally offset in an axial direction by a distance "x". This can be seen in particular in FIGS. 7a, 7b and 7d.

Figure 7A:
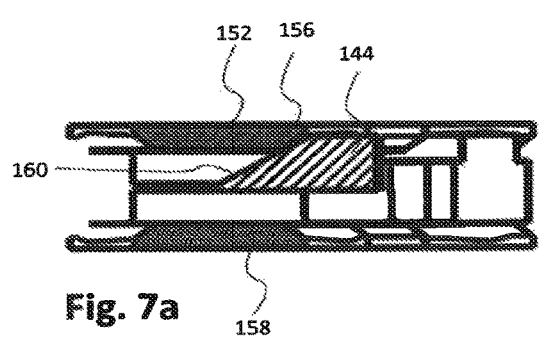
Figure 7B:
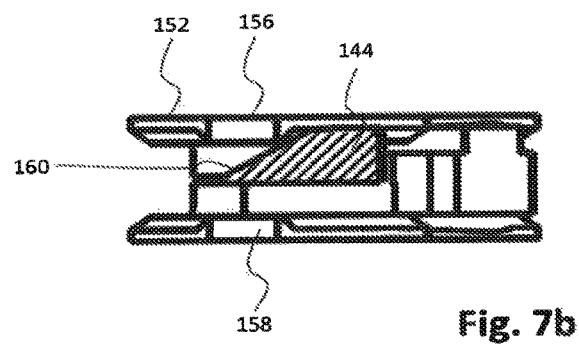
Figure 7C:
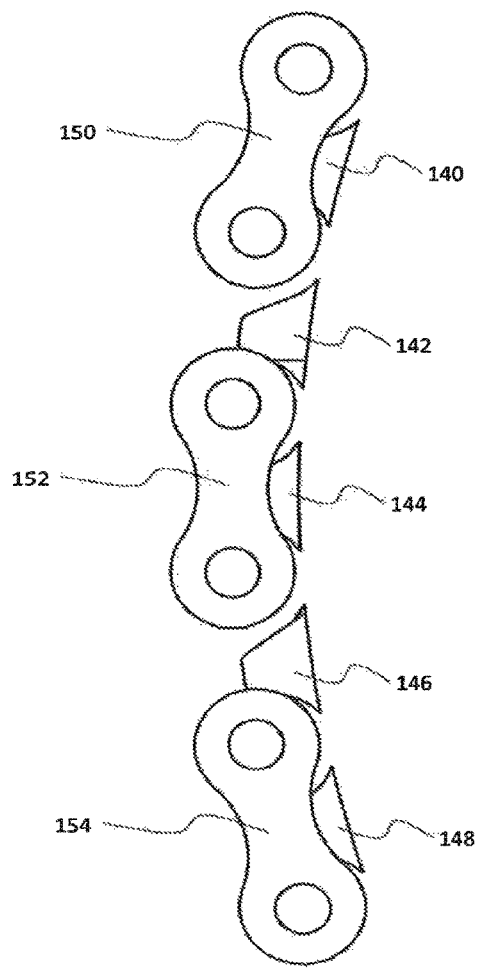
Figures 7D, 7E:
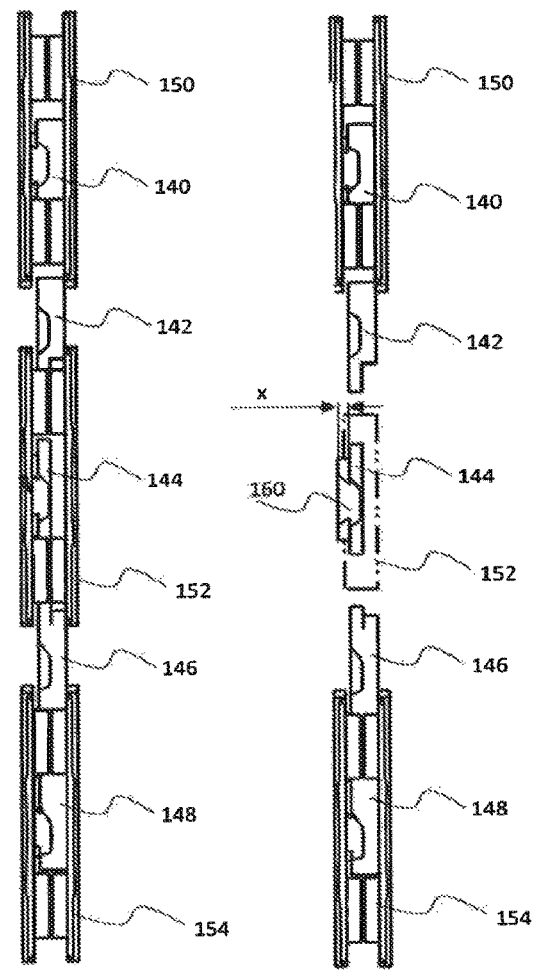

Owing to said lateral offset "x", which can be realized by way of application of material or an offset position, it can be achieved that, when a narrow chain link 152 strikes the riding-up tooth 144, owing to the laterally offset positioning of the latter, the narrow chain link 152 does not receive the riding-up tooth between the two (2) link plates 156, 158 of said narrow chain link. Instead, as shown in FIGS. 7a and 7b, the chain link plate 156 lies on an obliquely running tooth tip surface 160. This has the same riding-up effect as described in the introduction with reference to FIG. 2.

In turn, a sequence of such riding-up teeth, for example a corresponding offset positioning of the teeth 140 and 148, can have the effect that the drive chain is displaced radially outward over a relatively long section, in order thereby to realize a correction of the chain link plate orientation by virtue of the chain sliding onward by one (1) chain link in targeted fashion. Then, in each case a wide chain link of the chain strikes the one or more riding-up teeth. The lateral offset "x" is selected such that a wide chain link can fully receive the riding-up tooth 144.

Figure 8:
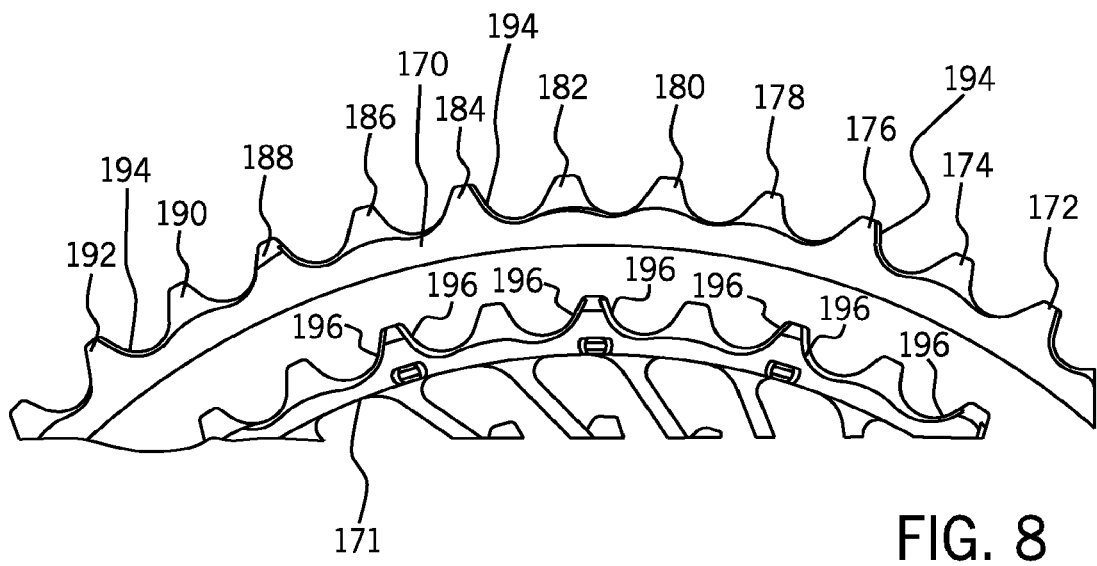
FIG. 8 shows detail of a pairing of two sprockets (view of the rear side)

FIG. 8 shows a further embodiment of the invention. In turn, a detail of a sprocket pairing composed of a sprocket 170 of large diameter and a sprocket 171 of relatively small diameter is shown. On the sprocket 170 of large diameter, a sequence of teeth 172, 174, 176, 178, 180, 182, 184, 186, 188, 190, 192 is shown, wherein the teeth 172, 176, 180, 184, 188, 192 are in the form of relatively thick teeth which are provided for engagement into wide chain links, whereas the teeth 174, 178, 182, 186, 190 are in the form of relatively thin teeth which are provided for engagement into narrow chain links. The thick teeth 172, 176, 180, 184, 188, 192 each have a tooth space formation 194 on their run-in flank. Depending on the tooth space formation and wear situation, it may however be advantageous for the riding-up tooth 180 to be formed without a chain link plate overhang recess 194 on the run-in flank. In this way, the breakage resistance and wear resistance of the riding-up tooth 180 are increased.

FIG. 8 shows said formation on the sprocket 170 of large diameter. The sprocket 172 of relatively small diameter has chain link plate overhang recesses 196 both on the load flank and on the run-in flank.

Figure 9:
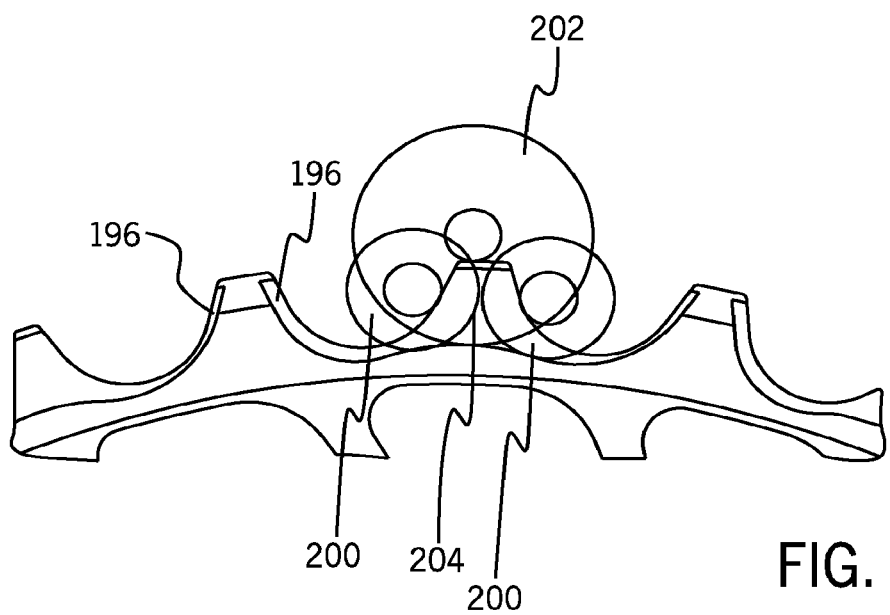
FIG. 9 is an illustration for explaining the production of the sprockets.

FIG. 9 is an illustration relating to the manufacture of riding-up teeth. The manufacture of the riding-up teeth constitutes a particular challenge in the case of milled sprocket arrangements, so-called sprocket clusters. Here, a multi-stage method may be provided, wherein two different T-shaped milling cutters 200, 202 are used. Using a relatively small milling cutter 200, the region of the cutouts around the tooth flanks of the respective tooth 204 is machined. A special milling cutter 202 with a relatively large diameter and a very thin shank region completes the machining behind the tooth 204.

Figure 10A:
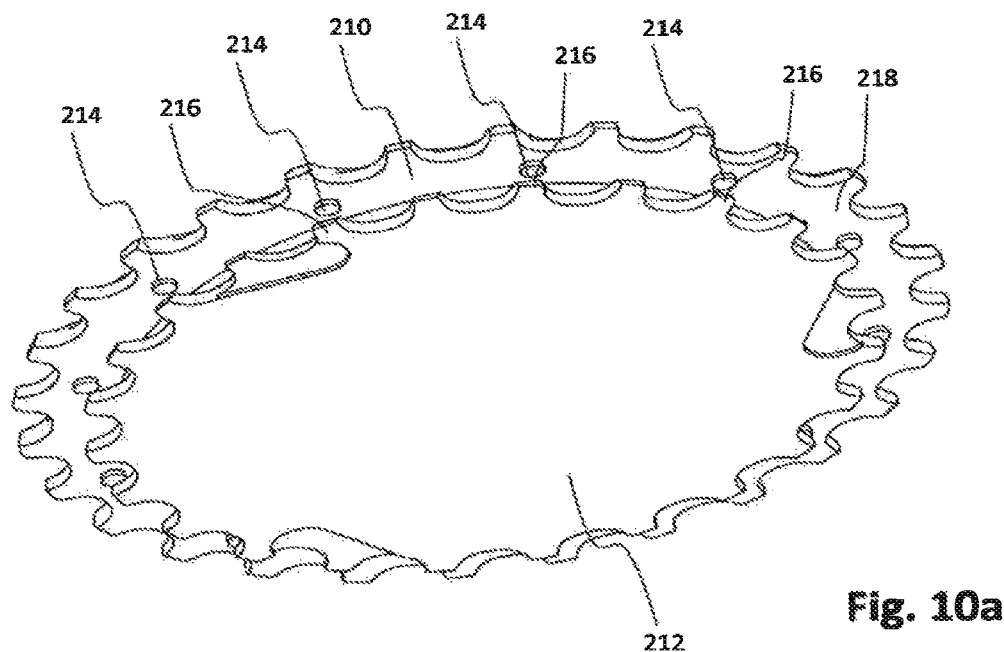
Figure 10B:
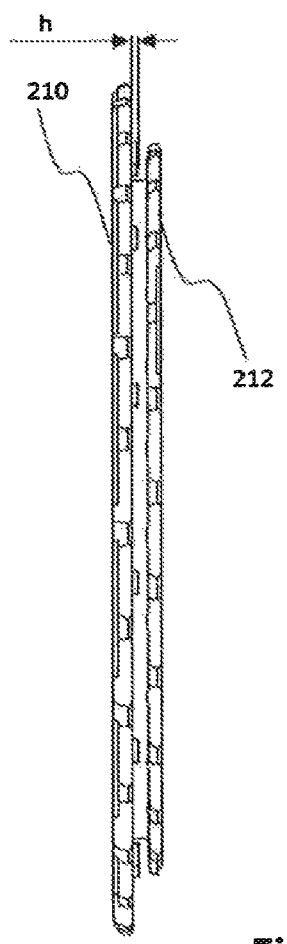
Figure 10C:
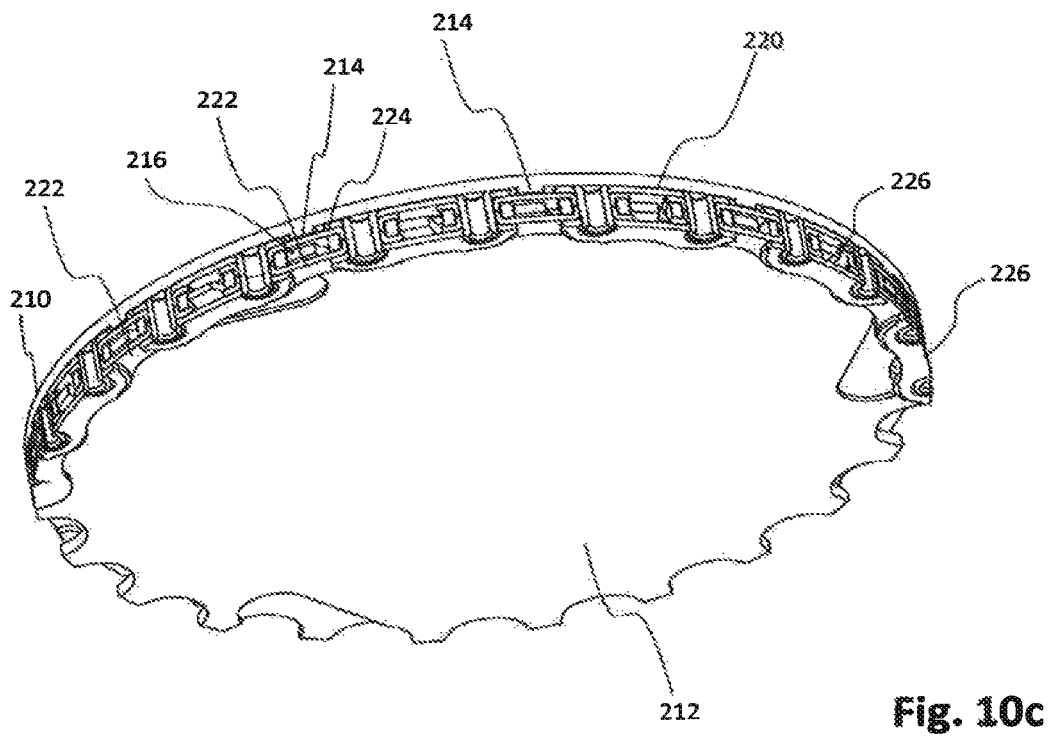
Figure 10D:
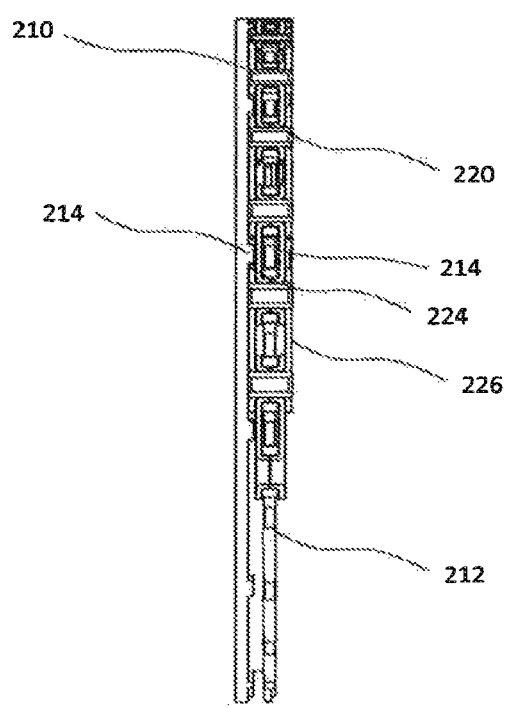
Figure 10E:
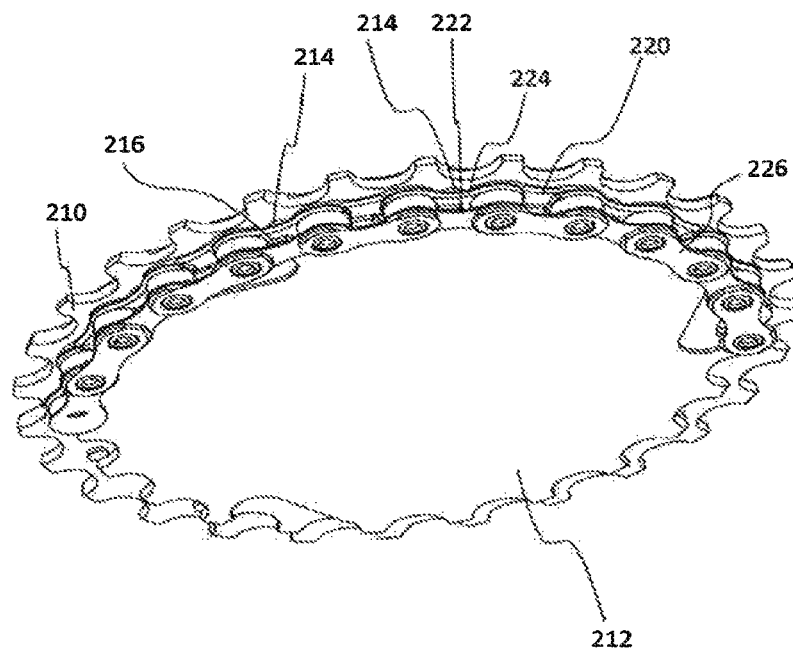
Figure 10F:
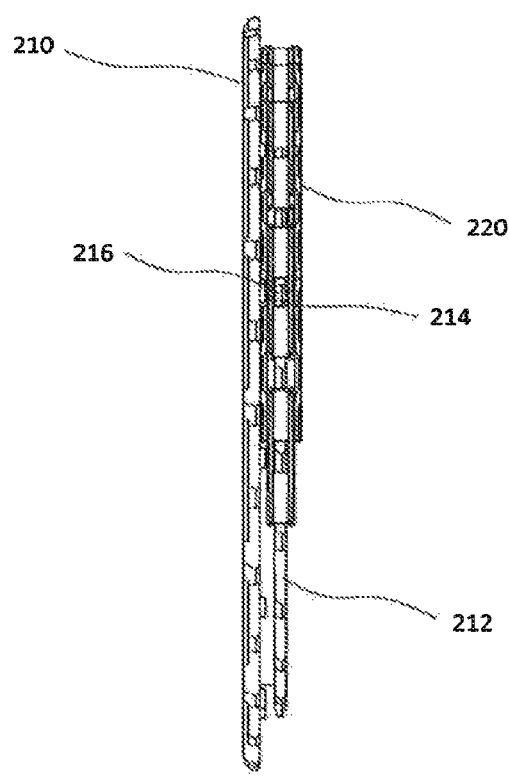

FIGS. 10a to 10f show a further embodiment of the invention. On the 3 pages of drawings, at the top in each case, FIGS. 10a, 10c, and 10e show a perspective view of an arrangement of a sprocket 210 of relatively large diameter and a sprocket 212 of relatively small diameter, and at the bottom in each case, FIGS. 10b, 10d, and 10f show a side view of said two (2) sprockets. On the front side of the relatively large sprocket 210, instead of riding-up teeth, a row of riding-up projections 214 is provided at regular intervals radially to the inside of the tooth formation, which riding-up projections extend over the circumference of the large sprocket. Said riding-up projections are arranged so as to be assigned to every second tooth 216 of the small sprocket 212, and are arranged so as to overlap said small sprocket at the level of the tooth tip of said teeth 216. Said riding-up projections are, in their axial extent in the direction from the front side 218 of the large sprocket 210 toward the small sprocket 112, that is to say in terms of their height "h", designed so as to permit the engagement of a narrow chain link with the teeth 216. This is shown in FIGS. 10c and 10d in a sectional illustration for a drive chain 220. It can be seen that the teeth 216 are in engagement with narrow chain links 222, wherein chain links 224 engage between the teeth 216 and the riding-up projections 214.

However, the riding-up projections 214 do not permit the engagement of a wide chain link 226, as is readily apparent. If a wide chain link 226 of a drive chain, in the case of an undesired chain link plate orientation as a result of a gearshift process, strikes a tooth 216 of said type, said wide chain link 226 lies on the radially outwardly pointing circumferential surface of the projections 214 and cannot enter into engagement with the tooth 216. The chain 220 would then, in a load situation, slip onward by the distance of one (1) chain link and thus be suitably oriented such that a narrow chain link 222 strikes a tooth 216 and can engage by way of its chain link plate 224 between the tooth 216 and the riding-up projection 214.

FIGS. 10e and 10f illustrate this once again, with a chain 220 being shown not in section.

With this embodiment, an orientation of the chain can be performed in order that targeted gearshift processes and reliable engagement of the chain with the sprocket can thereby be performed. This is advantageous for example if a gearshift is performed to the sprocket 212 proceeding from a sprocket of relatively small diameter or from the sprocket 210 of relatively large diameter, wherein, during said gearshift process, the chain strikes the sprocket whilst incorrectly oriented.

Above, various exemplary embodiments have been described which all present corrective features for arranging a chain in a desired chain link plate orientation relative to a sprocket. The corrective features comprise not only the described riding-up tooth or a sequence of riding-up teeth but also the possibility of riding-up projections which can likewise be arranged individually or in a sequence of multiple riding-up projections, and the possibility of a partially reduced root circle diameter which may be provided separately therefrom or in combination with riding-up teeth or riding-up projections, and furthermore the targeted arrangement of gearshift channels in combination with or separately from the stated corrective features, and a correspondingly advantageous design of the sprocket and of its teeth in the region of said gearshift channels. Any desired combination of these principles may be provided on a sprocket arrangement in accordance with requirements.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A multi-sprocket arrangement for a rear wheel hub of the bicycle, the multi-sprocket arrangement comprising:
a plurality of sprockets with different diameters, wherein the sprockets each have a plurality of teeth which are separated by tooth spaces, and which can be placed in engagement with a drive chain with wide chain links and narrow chain links which follow one another alternatively in succession,
wherein, on the circumference of at least a starting sprocket of the plurality of sprockets, at least one sequence of teeth is provided at a location where a changeover of the drive chain from the starting sprocket to a selected sprocket occurs, the sequence of teeth comprising a first tooth having a tooth base that is tangent to a root circle of the starting sprocket or lies radially outside of the root circle, and at least one additional tooth which follows the first tooth lies with its tooth base radially within the root circle of the starting sprocket, the tooth base of the first tooth being configured differently than the tooth base of the additional tooth.

2. The multi-sprocket arrangement according to claim 1, wherein the sequence of teeth comprises a plurality of additional teeth whose tooth bases lie radially within the root circle of the sprocket.

3. The multi-sprocket arrangement according to claim 2, wherein the additional teeth, which lie with their tooth bases radially within the root circle, of the sequence of teeth are, with increasing distance from the first tooth as viewed in the circumferential direction, arranged progressively further radially inward within the root circle of the respective sprocket.

4. The multi-sprocket arrangement according to claim 3, wherein a final additional tooth, which lies with its tooth base radially within the root circle, of the sequence of teeth is followed, as viewed in the circumferential direction, by a tooth which, with its tooth base, is tangent to the root circle of the sprocket or lies radially outside the root circle.

5. The multi-sprocket arrangement according to claim 4, wherein, adjacent to the final additional tooth, which lies with its tooth base radially within the root circle, of the sequence of teeth, a front recess for forming a gearshift channel is provided on the sprocket.

6. The multi-sprocket arrangement according to claim 1, wherein, on at least the selected sprocket, there are provided gearshift channels for a changeover of the drive chain between the selected sprocket and a relatively small sprocket, wherein, on the selected sprocket, there is provided at least one first gearshift channel for a changeover of the drive chain from the selected sprocket to a sprocket of relatively small diameter, and wherein, on the selected sprocket, there is provided at least one second gearshift channel for a changeover of the drive chain from a sprocket of relatively small diameter to the selected sprocket.

7. The multi-sprocket arrangement according to claim 6, wherein the at least one first gearshift channel and the at least one second gearshift channel are arranged so as to be spaced apart from one another as viewed in the circumferential direction of the selected sprocket.

8. The multi-sprocket arrangement according to claim 6, wherein each gearshift channel proceeds from a gearshift channel reference tooth, wherein the gearshift channel reference tooth is, in the case of a first gearshift channel, the first tooth of the selected sprocket which, during a departure from the selected sprocket, no longer engages into a chain link intermediate space of the drive chain.

9. The multi-sprocket arrangement according to claim 8, wherein a tooth of the selected sprocket which follows the gearshift channel reference tooth and which still engages into a chain link intermediate space of the drive chain is, at its side averted from the relatively small sprocket, formed with a reduced tooth thickness, wherein the material removal in relation to a conventional tooth without reduced tooth thickness extends to a depth of up to 1.7 millimeters.

10. The multi-sprocket arrangement according to claim 9, wherein those teeth of the selected sprocket which directly follow the gearshift channel reference tooth and which in each case still engage into a chain link intermediate space of the drive chain are, at their side averted from the sprocket of relatively small diameter, formed with a reduced tooth thickness.

11. The multi-sprocket arrangement according to claim 6, wherein the gearshift channel reference tooth is, at its tooth tip, formed with a bevel facing toward the sprocket of relatively small diameter.

12. The multi-sprocket arrangement according to claim 6, wherein, radially within the gearshift channel reference tooth, there is provided an outer link plate cutout, facing toward the sprocket of relatively small diameter, which extends into the respective sprocket to a greater depth than a recess, adjoining said cutout, on the gearshift channel reference tooth.

13. The multi-sprocket arrangement according to claim 12, wherein the outer link plate cutout is provided radially within the gearshift channel reference tooth and which extends into the selected sprocket to a greater depth, than a recess adjoining said cutout, to a tooth immediately preceding the gearshift channel reference tooth, of the selected sprocket.

14. The multi-sprocket arrangement according to claim 12, wherein the gearshift channel reference tooth has a load flank and a deflecting bevel both in the same region, and wherein the deflecting bevel extends as far as into a load-flank-side root circle of the gearshift channel reference tooth.

15. The multi-sprocket arrangement according to claim 14, wherein the load-flank-side deflecting bevel of the gearshift channel reference tooth transitions into the outer link plate cutout.

16. The multi-sprocket arrangement according to claim 6, wherein a quantity of the at least one second gearshift channel is greater than or equal to a quantity of the at least one first gearshift channel.

17. The multi-sprocket arrangement according to claim 16, wherein, in the case of a sprocket with eighteen teeth in combination with a sprocket of relatively small diameter with fifteen teeth, only one first gearshift channel and two second gearshift channels are provided.

18. The multi-sprocket arrangement according to claim 1, wherein, in each case, the surfaces of at least a subset of the teeth of at least one of the sprockets on a side pointing toward an adjacent sprocket of relatively small diameter lie substantially in a common plane, wherein the individual teeth which have a front recess are exceptions to this.

* * * * *